United States Patent
Duggan et al.

(10) Patent No.: US 6,257,986 B1
(45) Date of Patent: Jul. 10, 2001

(54) END YOKE FOR A UNIVERSAL JOINT ASSEMBLY

(75) Inventors: James A. Duggan, Temperance, MI (US); Robert G. Joyner, Toledo, OH (US)

(73) Assignee: Dana Corporation, Toledo, OH (US)

( * ) Notice: Subject to any disclaimer, the term of this patent is extended or adjusted under 35 U.S.C. 154(b) by 0 days.

(21) Appl. No.: 09/476,477

(22) Filed: Dec. 30, 1999

Related U.S. Application Data

(60) Provisional application No. 60/114,340, filed on Dec. 31, 1998.

(51) Int. Cl.$^7$ ............................................. F16D 3/16
(52) U.S. Cl. ........................ 464/134; 464/905; 403/155
(58) Field of Search ................................. 464/128, 129, 464/134, 135, 136, 905; 403/155

(56) References Cited

U.S. PATENT DOCUMENTS

| | | |
|---|---|---|
| 2,107,497 | 2/1938 | Padgett . |
| 2,271,523 | 2/1942 | Dunn . |
| 2,336,579 | 12/1943 | Venditty et al. . |
| 2,698,527 | 1/1955 | Anderson . |
| 3,783,638 * | 1/1974 | Doran et al. ......................... 464/130 |
| 4,167,859 * | 9/1979 | Okuda ................................. 464/129 |
| 5,000,609 * | 3/1991 | Dutkiewicz et al. ................ 403/155 |
| 5,692,959 * | 12/1997 | Schabel ............................... 464/134 |

* cited by examiner

Primary Examiner—Lynne H. Browne
Assistant Examiner—Aaron Dunwoody

(74) Attorney, Agent, or Firm—MacMillan, Sobanski & Todd, LLC

(57) ABSTRACT

A half round end yoke includes a pair of opposed arms, each terminating in an end surface having a recess and a pair of threaded bores. A cross includes a central body portion having four trunnions extending outwardly therefrom. A bearing cup is rotatably mounted on the end of each of the trunnions. The cross is initially positioned adjacent to the half round end yoke such that a pair of the bearing cups is received in the recesses formed in the arms. Then, a retainer strap is positioned adjacent to the cross and the half round end yoke. The retainer strap includes an elongated central body portion having a pair of transversely extending retainer portions. Each of the retainer portions includes a curved region having a pair of end regions extending outwardly therefrom. Each of the curved regions has an inner surface formed therein. The inner surfaces of the curved regions of the retainer strap receive portions of the bearing cups therein. The end regions of the retainer portions have respective holes formed therethrough that are sized to be aligned with threaded bores formed in the arms of the half round end yoke. Threaded bolts can then extend through the holes formed through the end regions of the retainer strap into cooperation with the threaded bores formed in the arms of the half round end yoke to secure the retainer strap thereto. Either the arms of the half round end yoke or the end regions of the retainer strap have retaining tangs formed thereon that positively restrain the bearing cups from being removed from the cross. The central body portion of the retainer strap extends between the two retainer portions thereof to increase the overall rigidity of the half round end yoke, which minimizes undesirable relative movement of the two arms and provides increased support to the cross.

19 Claims, 3 Drawing Sheets

END YOKE FOR A UNIVERSAL JOINT ASSEMBLY

CROSS REFERENCE TO RELATED APPLICATION

This application claims the benefit of U.S. Provisional Application No. 60/114,340, filed Dec. 31, 1998, the disclosure of which is incorporated herein by reference.

BACKGROUND OF THE INVENTION

This invention relates in general to universal joint assemblies for vehicular drive train systems. In particular, this invention relates to an improved structure for retaining the bearing cups within the associated recesses of a half round end yoke.

Universal joint assemblies are well known devices that provide a driving connection between two members adapted to rotate about non-aligned axes of rotation. Universal joint assemblies are widely used between rotatable drive shaft sections in vehicle drive train systems. A typical universal joint assembly includes a cross having a central body portion with four cylindrical trunnions extending outwardly from the cross. The trunnions are oriented in a single plane and extend at right angles relative to one another, and the trunnions have a common intersection at the center of the central body portion. A hollow cylindrical bearing cup is mounted on the end of each of the trunnions. Needle bearings or similar means are provided between the outer cylindrical surfaces of the trunnions and the inner cylindrical surfaces of the bearing cups to permit relative rotational movement between the trunnions and the bearing cups. The bearing cups that are mounted on an opposed pair of the trunnions can be connected to a first end yoke secured to an end of a first drive shaft section, while the bearing cups that are mounted on a second opposed pair of the trunnions can be connected to a second end yoke secured to an end of a second drive shaft section.

Typically, the first and second end yokes can be classified as one of two well known structures, namely, a full round end yoke and a half round end yoke. A full round end yoke includes a pair of opposed arms having respective cylindrical openings formed therethrough, within which the opposed bearing cups are inserted. Flat retaining members are usually provided over the outer ends of the bearing cups for retaining them within the associated cylindrical openings. A half round end yoke includes a pair of opposed arms having respective semi-cylindrical recesses formed therein, within which portions of the opposed bearing cups are received. Retaining straps are usually provided about the circumferential sides of the bearing cups for retaining them within the associated semi-cylindrical recesses.

A typical structure for a retaining strap for use with a half round end yoke consists of a stamped plate or similar member including a curved central portion having a pair of end portions extending outwardly therefrom. The curved central portion of the retainer strap is generally semi-cylindrical in shape so as to conform with the outer surface of the bearing cup. The end portions of the retainer strap have respective holes formed therethrough that can be aligned with threaded bores formed in the arms of the half round end yoke. Threaded bolts or similar fasteners extend through the holes formed through the end portions of the retainer strap into cooperation with the threaded bores formed in the arms of the half round end yoke so as to secure the retainer strap thereto. In this manner, each of the bearing cups is retained within its associated semi-cylindrical recess of the half round end yoke by the retainer strap. Although known retainer straps have been used effectively for many years, it would be desirable to provide an improved structure for retaining the bearing cups within the associated recesses of a half round end yoke.

SUMMARY OF THE INVENTION

This invention relates to an improved structure for retaining the bearing cups within the associated recesses of a half round end yoke. The half round end yoke includes a pair of opposed arms, each of which terminates in an end surface having a generally semi-cylindrical recess and a pair of threaded bores formed therein. A cross includes a central body portion having four cylindrical trunnions extending outwardly therefrom. A bearing cup is rotatably mounted on the end of each of the trunnions. The cross is initially positioned adjacent to the half round end yoke such that a pair of the bearing cups is received in the semi-cylindrical recesses formed in the arms. Then, a retainer strap is positioned adjacent to the cross and the half round end yoke. The retainer strap includes an elongated central body portion having a pair of transversely extending retainer portions. Each of the retainer portions includes a curved region having a pair of end regions extending outwardly therefrom. Each of the curved regions has a generally semi-cylindrical inner surface formed therein. The semi-cylindrical inner surfaces of the curved regions of the retainer strap receive portions of the first pair of the bearing cups therein. The end regions of the retainer portions have respective holes formed therethrough that are sized to be aligned with threaded bores formed in the arms of the half round end yoke. Threaded bolts can then extend through the holes formed through the end regions of the retainer strap into cooperation with the threaded bores formed in the arms of the half round end yoke to secure the retainer strap thereto. In a first embodiment of the invention, each of the arms of the half round end yoke has a retaining tang formed thereon that positively restrains the bearing cups from being removed from the cross. In a second embodiment of the invention, each of the end regions of the retainer strap has a retaining tang formed thereon that positively restrains the bearing cups from being removed from the cross. The central body portion of the retainer strap extends between the two retainer portions thereof to increase the overall rigidity of the half round end yoke, which minimizes undesirable relative movement of the two arms and provides increased support to the cross, resulting in better bearing life and increased strength to the universal joint.

Various objects and advantages of this invention will become apparent to those skilled in the art from the following detailed description of the preferred embodiments, when read in light of the accompanying drawings.

DETAILED DESCRIPTION OF THE PREFERRED EMBODIMENTS

Figure 1:
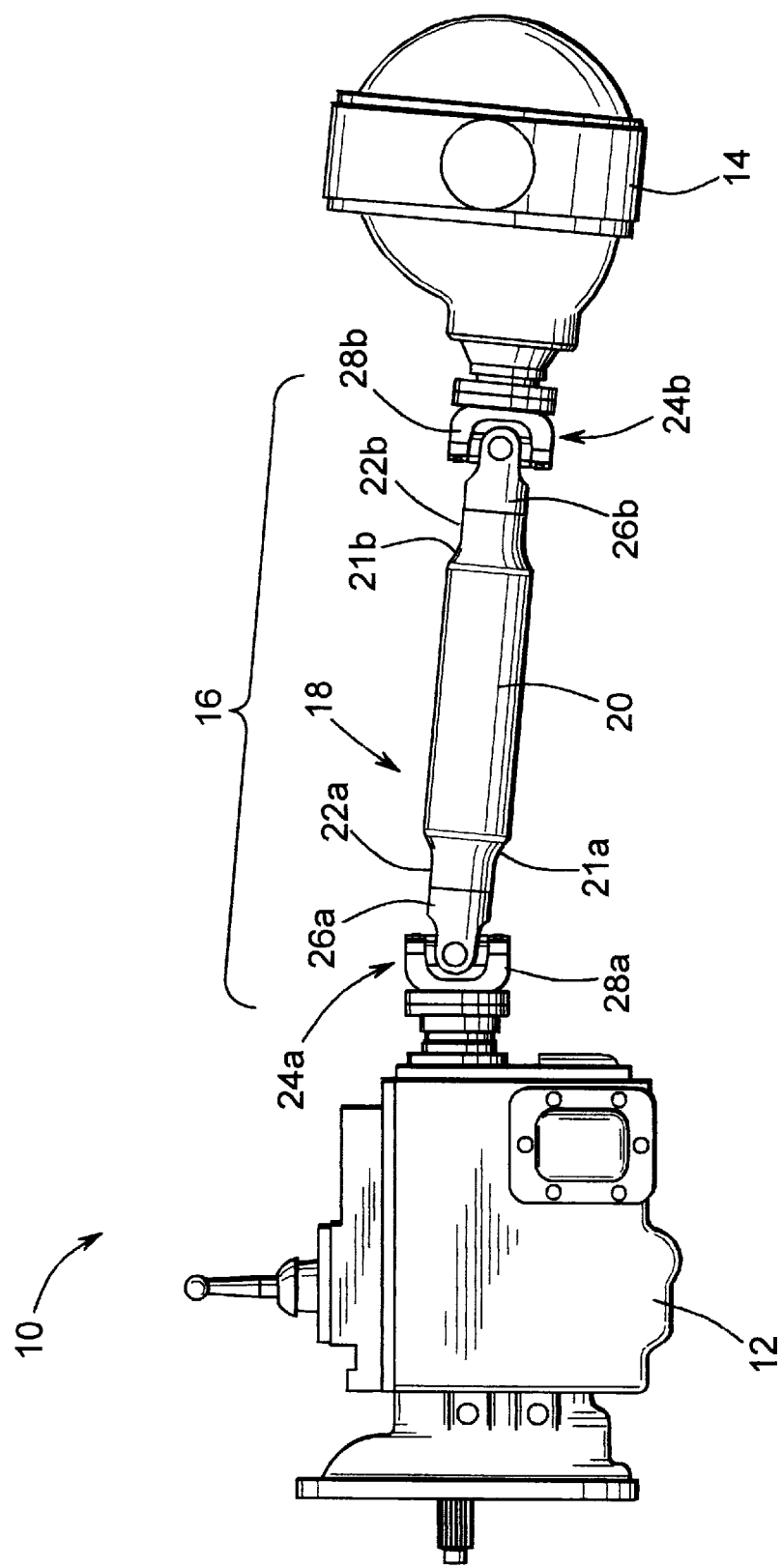
FIG. 1 is a side elevational view schematically illustrating a vehicle drive train assembly including a pair of universal joints, each having a half round end yoke and a retainer strap in accordance with the invention.

Referring now to the drawings, there is illustrated in FIG. 1 a vehicle drive train assembly, indicated generally at 10, that is generally conventional in the art. The drive train assembly 10 includes a transmission 12 having an output shaft (not shown) that is connected to an input shaft (not shown) of an axle assembly 14 through a driveshaft assembly 16. The transmission 12 is rotatably driven by an engine (not shown) or other source of rotational power in a conventional manner. The driveshaft assembly 16 includes a cylindrical driveshaft tube, indicated generally at 18, having a center portion 20 and a pair of opposed end portions 22a and 22b. The driveshaft tube 18 is preferably formed from an aluminum alloy material, although such is not necessary. In the illustrated embodiment, the center portion 20 of the driveshaft tube 18 is formed having a larger outer diameter than either of the end portions 22a and 22b. Thus, respective transition regions 21a and 21b are defined between the larger diameter center portion 20 of the illustrated driveshaft tube 18 and each of the smaller diameter end portions 22a and 22b thereof. However, the driveshaft tube 18 may be formed having a constant diameter throughout the length thereof or any other desired shape. Alternatively, the single driveshaft tube 18 may be replaced by a compound driveshaft assembly (not shown) having separate first and second driveshaft sections that are supported by a center bearing assembly between the transmission 12 and the axle assembly 14. The driveshaft tube 16 can be formed from any suitable material, such as a lightweight aluminum alloy (6061 alloy, for example).

The output shaft of the transmission 12 and the input shaft of the axle assembly 14 are typically not co-axially aligned. To accommodate this, a pair of universal joints, indicated generally at 24a and 24b, are provided at the end portions 22a and 22b of the driveshaft tube 18 to respectively connect the driveshaft tube 18 to the output shaft of the transmission 12 and to the input shaft of the axle assembly 14. The first universal joint 24a includes a tube yoke 26a that is secured to the forward end portion 22a of the driveshaft tube 18 by any conventional means, such as by welding or adhesives. The first universal joint 24a further includes a half round end yoke 28a that is connected to the output shaft of the transmission 12. The second universal joint 24b includes a tube yoke 26b that is secured to the rearward end portion 22b of the driveshaft tube 18 by any conventional means, such as by welding or adhesives. The second universal joint 24b further includes a half round end yoke 28b that is connected to the input shaft of the axle assembly 14. The structures of the half round end yokes 28a and 28b will be described in detail below.

Figure 2:
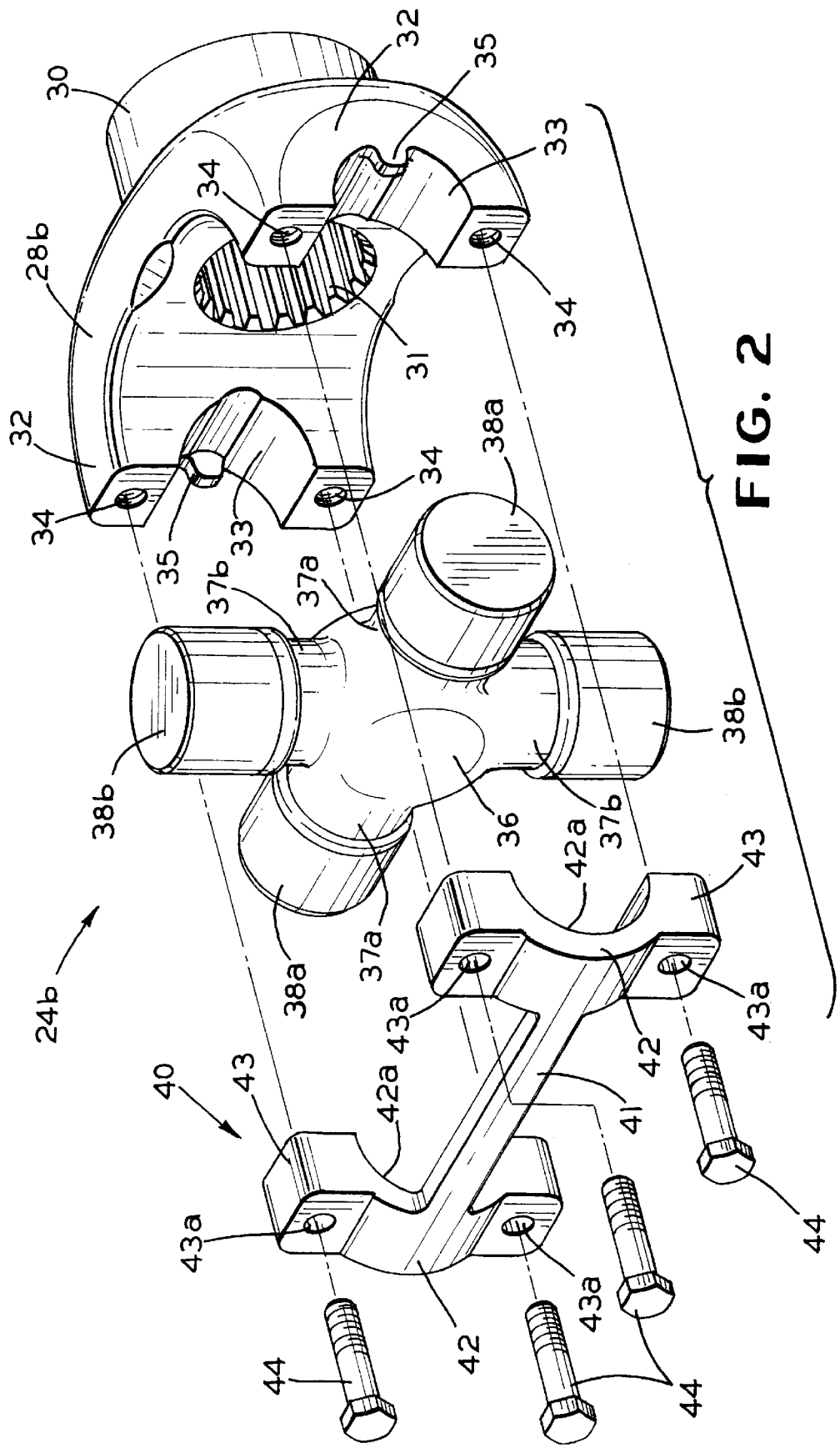
FIG. 2 is an enlarged exploded perspective view of a portion of one of the universal joints illustrated in FIG. 1 including a first embodiment of a half round end yoke and a bearing retainer strap in accordance with this invention.

FIG. 2 is an enlarged exploded perspective view of a portion of one of the universal joints 24b illustrated in FIG. 1 including a first embodiment of the half round end yoke 28b in accordance with this invention. The half round end yoke 28b includes a generally hollow cylindrical body 30 defining an inner circumferential surface having a plurality of internal splines 31 formed therein. A pair of opposed arms 32 extend generally axially from the body 30. Each of the opposed arms 32 terminates in a flat end surface having a generally semi-cylindrical recess 33 and a pair of threaded bores 34 formed therein. Also, each of the opposed arms 32 includes a retaining tang 35 that extends inwardly over a portion of the associated semi-cylindrical recess 33. The purposes for the semi-circular recesses 33, the threaded bores 34, and the retaining tangs 35 will be explained below.

The universal joint 24b also includes a cross 36 having a central body portion with two pairs of generally cylindrical trunnions 37a and 37b extending outwardly from the cross 36. The trunnions 37a and 37b are oriented in a single plane and extend at right angles relative to one another, and the trunnions 37a and 37b have a common intersection at the center of the central body portion. Hollow cylindrical bearing cups 38a and 38b are mounted on the end of the trunnions 37a and 37b. Needle bearings (not shown) or similar means are provided between the outer cylindrical surfaces of the trunnions 37a and 37b and the inner cylindrical surfaces of the bearing cups 38a and 38b to facilitate relative rotational movement between the trunnions 37a and 37b and the bearing cups 38a and 38b. The bearing cups 38a that are mounted on a first opposed pair of the trunnions 37a can be connected to the half round end yoke 28b in the manner described in detail below, while the bearing cups 38b that are mounted on a second opposed pair of the trunnions 37b can be connected to the tube yoke 26b of the driveshaft assembly 16 in a known manner.

The universal joint 24b further includes a first embodiment of a retainer strap, indicated generally at 40, in accordance with this invention. The retainer strap 40 includes an elongated central body portion 41 having a pair of transversely extending retainer portions. In the illustrated embodiment, the retainer portions are formed integrally with the central body portion 41, although such is not necessary. Each of the retainer portions includes a curved region 42 having a pair of end regions 43 extending outwardly therefrom. Each of the curved regions 42 has a generally semi-cylindrical inner surface 42a formed therein. The end regions 43 of the retainer portions have respective holes 43a formed therethrough that are sized to be aligned with the threaded bores 34 formed in the arms 32 of the half round end yoke 28b. The purposes of the semi-cylindrical inner surfaces 42a and the holes 43a will be explained below.

To assemble the universal joint 24b, the cross 36 is initially positioned adjacent to the half round end yoke 28b. When so positioned, portions of the first pair of the bearing cups 38a are received in the semi-cylindrical recesses 33 formed in the arms 32. Preferably, the semi-cylindrical recesses 33 generally correspond in shape to the outer surfaces of the bearing cups 38a to provide a smooth frictional engagement therebetween. At the same time, the retaining tangs 35 formed on the arms 32 of the half round end yoke 28b extend partially over the outer end surfaces of the bearing cups 38a. As a result, the bearing cups 38a are engaged by the retaining tangs 35 so as to be positively restrained from being removed from the trunnions 37a of the cross 36.

Then, the retainer strap 40 is positioned adjacent to the cross 36 and the half round end yoke 28b. When so positioned, the semi-cylindrical inner surfaces 42a of the curved regions 42 of the retainer strap 40 receive portions of the first pair of the bearing cups 38a therein. Preferably, the semi-cylindrical inner surfaces 42a generally correspond in shape to the outer surfaces of the bearing cups 38a to provide a smooth frictional engagement therebetween. At the same time, the holes 43a formed through the end regions 43 of the retainer strap 40 are aligned with the threaded bores 34 formed in the arms 32 of the half round end yoke 28b. Conventional threaded bolts 44 or similar fasteners can then extend through the holes 43a formed through the end regions 43 of the retainer strap 40 into cooperation with the threaded bores 34 formed in the arms 32 of the half round end yoke 28b to secure the retainer strap 40 thereto. As a result, the cross 36 and the bearing cups 38a are secured to the half round end yoke 28b for use.

As mentioned above, the central body portion 41 of the retainer strap 40 extends between the two retainer portions thereof. This structure increases the overall rigidity of the half round end yoke 28b, which minimizes undesirable relative movement of the two arms 32, and provides increased support to the cross 36. This results in better bearing life and increased strength to the universal joint 24b. The retainer strap 40 may be formed from any desired material, including metals (such as aluminum, magnesium, steel, and alloys thereof), composites (such as carbon fiber), or combinations thereof.

In practice, the driveshaft assembly 16 (including the driveshaft tube 18, the tube yokes 26a and 26b, and the crosses 36 of the universal joints 24a and 24b) is usually manufactured in one location, then shipped as a unit for installation into the vehicle between the half round end yokes 28a and 28b respectively provided on the transmission 12 and the axle assembly 14. In this instance, it may be desirable to assemble the driveshaft assembly 16 with retaining straps 40 at both of the universal joints 24a and 24b for shipment therewith. In other words, during assembly of the driveshaft assembly 16, a first retaining strap 40 is provided between the first tube yoke 26a and the cross 36 associated therewith for subsequent connection to the first half round end yoke 28a, while a second retaining strap 40 is provided between the second tube yoke 26b and the cross 36 associated therewith for subsequent connection to the second half round end yoke 28b. Although such retaining straps 40 will hang loosely on the universal joints 24a and 24b until the driveshaft assembly 16 is installed between the half round end yokes 28a and 28b, the shipment of such retaining straps 40 with the driveshaft assembly 16 will facilitate the installation process.

Figure 3:
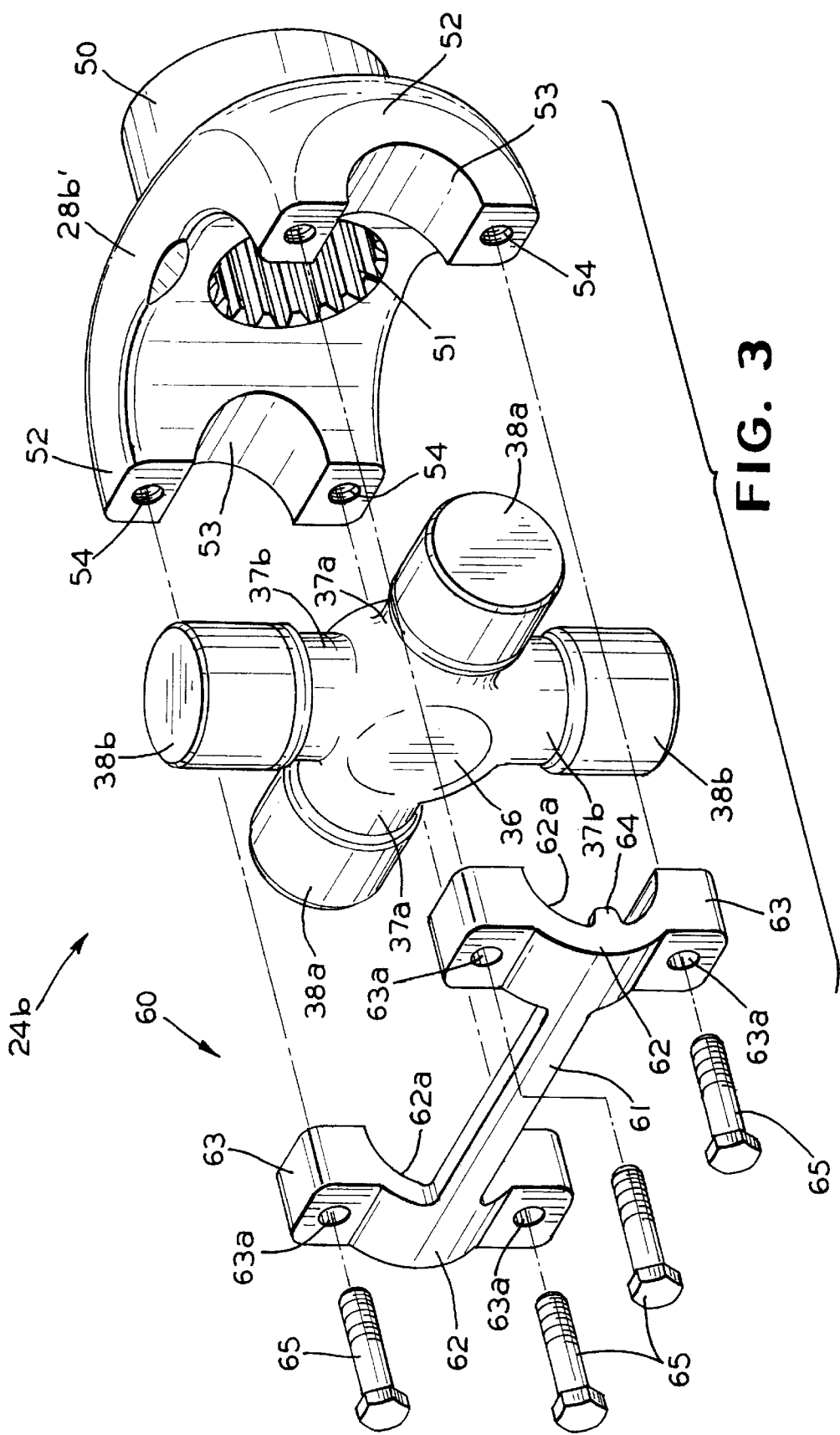
FIG. 3 is an enlarged exploded perspective view of a portion of one of the universal joints illustrated in FIG. 1 including a second embodiment of a half round end yoke and a bearing retainer strap in accordance with this invention.

FIG. 3 is an enlarged exploded perspective view of a portion of one of the universal joints 24b illustrated in FIG. 1 including a second embodiment of the half round end yoke 28b' in accordance with this invention. The half round end yoke 28b' includes a generally hollow cylindrical body 50 defining an inner circumferential surface having a plurality of internal splines 51 formed therein. A pair of opposed arms 52 extend generally axially from the body 50. Each of the opposed arms 52 terminates in a flat end surface having a generally semi-cylindrical recess 53 and a pair of threaded bores 54 formed therein. The purposes for the semi-circular recesses 53 and the threaded bores 54 will be explained below.

The universal joint 24b also includes a cross 36 having a central body portion with four generally cylindrical trunnions 37a and 37b extending outwardly from the cross. The trunnions 37a and 37b are oriented in a single plane and extend at right angles relative to one another, and the trunnions 37a and 37b have a common intersection at the center of the central body portion. Hollow cylindrical bearing cups 38a and 38b are mounted on the end of the trunnions 37a and 37b. Needle bearings (not shown) or similar means are provided between the outer cylindrical surfaces of the trunnions 37a and 37b and the inner cylindrical surfaces of the bearing cups 38a and 38b to facilitate relative rotational movement between the trunnions 37a and 37b and the bearing cups 38a and 38b. The bearing cups 38a that are mounted on a first opposed pair of the trunnions 37a can be connected to the half round end yoke 28b' in the manner described in detail below, while the bearing cups 38b that are mounted on a second opposed pair of the trunnions 37b can be connected to the tube yoke 26b of the driveshaft assembly 16 in a known manner.

The universal joint 24b further includes a second embodiment of a retainer strap, indicated generally at 60, in accordance with this invention. The retainer strap 60 includes an elongated central body portion 61 having a pair of transversely extending retainer portions. In the illustrated embodiment, the retainer portions are formed integrally with the central body portion 61, although such is not necessary. Each of the retainer portions includes a curved region 62 having a pair of end regions 63 extending outwardly therefrom. Each of the curved regions 62 has a generally semi-cylindrical inner surface 62a formed therein. The end regions 63 of the retainer portions have respective holes 63a formed therethrough that are sized to be aligned with the threaded bores 54 formed in the arms 52 of the half round end yoke 28b'. Also, each of the curved regions 62 includes a retaining tang 64 (only one is illustrated) that extends inwardly over a portion of the associated semi-cylindrical inner surface 62a. The purposes of the semi-cylindrical inner surfaces 62a, the holes 63a, and the retaining tangs 64 will be explained below.

To assemble the universal joint 24b, the cross 36 is initially positioned adjacent to the half round end yoke 28b'. When so positioned, portions of the first pair of the bearing cups 38a are received in the semi-cylindrical recesses 53 formed in the arms 52. Preferably, the semi-cylindrical recesses 53 generally correspond in shape to the outer surfaces of the bearing cups 38a to provide a smooth frictional engagement therebetween.

Then, the retainer strap 60 is positioned adjacent to the cross 36 and the half round end yoke 28b'. When so positioned, the semi-cylindrical surfaces 62a of the curved regions 62 of the retainer strap 60 receive portions of the first pair of the bearing cups 38a therein. Preferably, the semi-cylindrical inner surfaces 62a generally correspond in shape to the outer surfaces of the bearing cups 38a to provide a smooth frictional engagement therebetween. At the same time, the retaining tangs 64 formed on the curved regions 62 of the retainer strap 60 extend partially over the outer end surfaces of the bearing cups 38a. As a result, the bearing cups 38a are engaged by the retaining tangs 64 so as to be positively restrained from being removed from the trunnions 37a of the cross 36. Additionally, the holes 63a formed through the end regions 63 of the retainer strap 60 are aligned with the threaded bores 54 formed in the arms 52 of the half round end yoke 28b'. Conventional threaded bolts 65 or similar fasteners can then extend through the holes 63a formed through the end regions 63 of the retainer strap 60 into cooperation with the threaded bores 54 formed in the arms 52 of the half round end yoke 28b' to secure the retainer strap 60 thereto. As a result, the cross 36 and the bearing cups 38a are secured to the half round end yoke 28b' for use in the same manner as described above. If desired, the retainer strap 60 illustrated in FIG. 3 can be used with the half round end yoke 28b illustrated in FIG. 2 such that both sets of retaining tabs 65 and 35 may be used to positively restrain the bearing cups 38a from being removed from the trunnions 37a of the cross 36.

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

What is claimed is:

1. A yoke and cross assembly for use in a universal joint comprising:

a yoke including a body having a pair of arms extending therefrom, each of said arms terminating in an end surface having a recess formed therein;

a cross including a body portion having a pair of trunnions extending therefrom, each of said trunnions having a bearing cup rotatably mounted thereon, portions of said bearing cups being received in said recesses formed in said arms; and a retainer strap including a body portion having a pair of retainer portions, portions of said retainer portions extending about respective portions of said bearing cups and being respectively secured to said arms to retain said bearing cups in said recesses.

2. The end yoke defined in claim 1 wherein each of said arms of said yoke includes a retaining tang that extends at least partially over an outer end surface of said bearing cup.

3. The end yoke defined in claim 1 wherein each of said retainer portions of said retainer strap includes a retaining tang that extends at least partially over an outer end surface of said bearing cup.

4. The end yoke defined in claim 1 wherein said retainer portions of said retainer strap are formed integrally with said body portion.

5. The end yoke defined in claim 1 wherein each of the retainer portions includes a central region having a pair of end regions extending outwardly therefrom.

6. The end yoke defined in claim 5 wherein each of said central regions has a curved inner surface that extends about a portion of said bearing cup.

7. The end yoke defined in claim 5 wherein each of said end regions has a hole formed therethrough.

8. The end yoke defined in claim 7 wherein said holes formed through said end regions are aligned with threaded bores formed in said arms.

9. The end yoke defined in claim 8 further including threaded fasteners extending said holes formed through said end regions into cooperation with said threaded bores formed in said arms.

10. A drive train assembly comprising:

a transmission;

an axle assembly; and a driveshaft assembly extending between said transmission and said axle assembly, said driveshaft assembly including a driveshaft tube having first and second ends, a first universal joint connected between said transmission and said first end of said driveshaft tube, and a second universal joint connected between said second end of said driveshaft tube and said axle assembly, wherein one of said first and second universal joints having a yoke including a body having a pair of arms extending therefrom, each of said arms terminating in an end surface having a recess formed therein, a cross including a body portion having a pair of trunnions extending therefrom, each of said trunnions having a bearing cup rotatably mounted thereon, portions of said bearing cups being received in said recesses formed in said arms, and a retainer strap including a body portion having a pair of retainer portions, portions of said retainer portions extending about respective portions of said bearing cups and being respectively secured to said arms to retain said bearing cups in said recesses.

11. The end yoke defined in claim 10 wherein each of said arms of said yoke includes a retaining tang that extends at least partially over an outer end surface of said bearing cup.

12. The end yoke defined in claim 10 wherein each of said retainer portions of said retainer strap includes a retaining tang that extends at least partially over an outer end surface of said bearing cup.

13. The drive train assembly defined in claim 10 wherein said retainer portions of said retainer strap are formed integrally with said body portion.

14. The drive train assembly defined in claim 10 wherein each of the retainer portions includes a central region having a pair of end regions extending outwardly therefrom.

15. The drive train assembly defined in claim 14 wherein each of said central regions has a curved inner surface that extends about a portion of said bearing cup.

16. The drive train assembly defined in claim 14 wherein each of said end regions has a hole formed therethrough.

17. The drive train assembly defined in claim 16 wherein said holes formed through said end regions are aligned with threaded bores formed in said arms.

18. The drive train assembly defined in claim 17 further including threaded fasteners extending said holes formed through said end regions into cooperation with said threaded bores formed in said arms.

19. The drive train assembly defined in claim 10 wherein both of said first and second universal joints has a yoke including a body having a pair of arms extending therefrom, each of said arms terminating in an end surface having a recess formed therein, a cross including a body portion having a pair of trunnions extending therefrom, each of said trunnions having a bearing cup rotatably mounted thereon, portions of said bearing cups being received in said recesses formed in said arms, and a retainer strap including a body portion having a pair of retainer portions, portions of said retainer portions extending about respective portions of said bearing cups and being respectively secured to said arms to retain said bearing cups in said recesses.

\* \* \* \* \*